July 20, 1965 J. R. BRAND 3,196,200

ELECTRONIC MUSICAL INSTRUMENT OSCILLATOR

Filed May 11, 1960 2 Sheets-Sheet 1

INVENTOR.
John R. Brand
BY Olson & Trexler attys

INVENTOR.
John R Brand
BY
Olson & Trexler attys.

United States Patent Office 3,196,200
Patented July 20, 1965

3,196,200
ELECTRONIC MUSICAL INSTRUMENT OSCILLATOR

John R. Brand, Corinth, Miss., assignor to The Wurlitzer Company, Chicago, Ill., a corporation of Ohio Filed May 11, 1960, Ser. No. 28,341
2 Claims. (Cl. 84—1.05)

This invention is concerned with tone or oscillation producers for an electronic organ or the like, and more particularly with an improved frequency divider.

It is known that an electronic musical instrument can be constructed utilizing one octave of master oscillators of great stability. The oscillations of these master oscillators then are multiplied or divided by slave oscillators which are controlled by the master oscillators. The slave oscillators can be of much less critical construction, since they are synchronized by the master oscillators. A divider type oscillator has inherent advantages over multiplying type oscillators in that any of the driving signal appearing in the output will be a natural harmonic whereas in multiplying type oscillators any driving signal appearing in the output is an unnatural sub-harmonic.

Prior art divider type oscillators have had certain disadvantages. Most particularly, they will synchronize only over a rather limited range. This requires selection of relatively critical components in construction. Furthermore, tube characteristics vary quite widely, and components change with age. For example, paper capacitors increase in capacity. In addition, voltages may change as components age. All of this makes construction of a divider type oscillator which will synchronize properly in the first place, and remain in synchronism for a number of years relatively difficult and expensive. In addition, vibrato which has been produced by varying the grid bias of the master oscillator has been rather restricted. If efforts had been made with prior art divider oscillators to obtain any great degree of vibrato by swinging the grid bias, the divider oscillators have tended to become detuned to such an extent that they have actually stopped oscillating.

Accordingly, it is an object of this invention to provide a divider type oscillator tone generating system which is stable over a much greater frequency range than heretofore thought possible.

It is another object of this invention to provide a divider type oscillator system in which the output voltage is substantially constant over the entire frequency range of the oscillator.

More particularly, it is an object of this invention to provide a divider type oscillator system wherein a feedback signal varies in phase opposite to its variation in magnitude with changes in frequency whereby the effective magnitude of the fedback signal remains substantially constant throughout the frequency range of the divider oscillator.

Yet another object of this invention is to provide a divider oscillator system in accordance with the preceding objects wherein the output wave is rich in harmonics.

Other and further objects and advantages of the present invention will be apparent from the following description when taken in connection with the accompanying drawings wherein:

FIG. 1 is a schematic wiring diagram of one string of oscillators comprising a master oscillator and four slave oscillators operating an octave apart;

FIG. 1*a* is a block diagram of the remainder of an electronic organ utilizable with an octave of strings of dividers as in FIG. 1; and FIG. 2 is a graphical representation of the wave shape of the driving voltage at the source;

Figures 1, 1A:
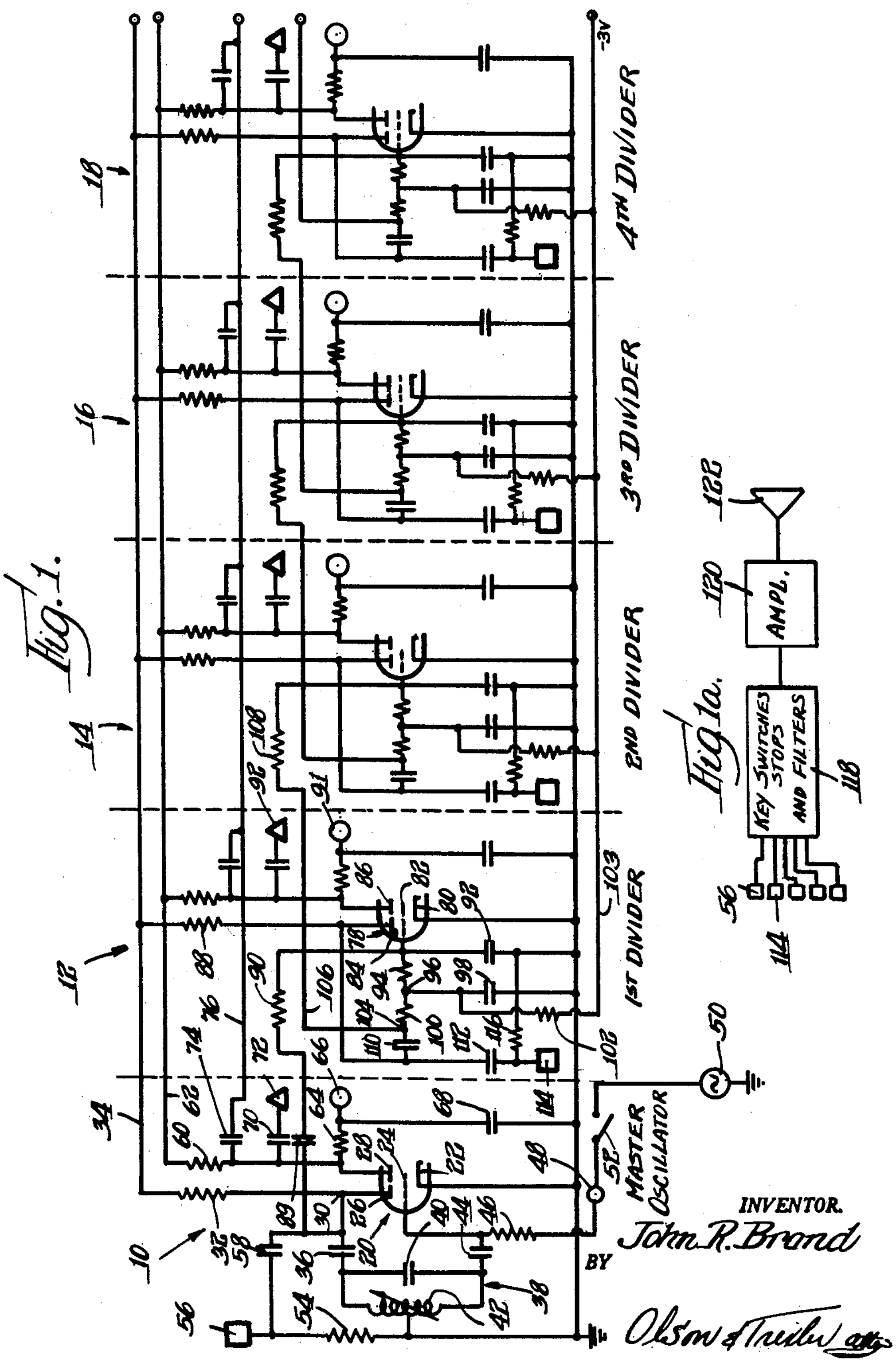

Reference now should be had to FIG. 1 of the drawings wherein there is shown a master oscillator designated generally by the numeral 10. A string of divider oscillators 12, 14, 16 and 18 is connected to and controlled by the master oscillator 10. As will be understood, the divider or slave oscillator 12 is controlled directly by the master oscillator 10, while the second slave or divider oscillator 14 is controlled by the first slave or divider oscillator 12, etc.

The master oscillator 10 is of the Hartley type and includes a vacuum tube 20. Particular attention should be paid to the vacuum tube 20, since it is a type 12FQ8 tube recently developed by General Electric comprising a single cathode 22, a single control grid 24, and two plates 26 and 28. The two plates 26 and 28 are both equal in size and configuration and in effect. This is not the common usage of beam forming plates of a pentode as auxiliary plates nor is it any other such inferior expedient. The cathode 22 is directly grounded, as shown, while the first plate 26 is connected to junction point 30. The junction point 30 is connected through a plate load resistor 32 to a B+ supply line 34. The junction 30 is also connected through a coupling capacitor 36 to the tuned circuit 38 comprising a fixed capacitor 40 and a tunable or variable inductance 42. The opposite end of the tuned circuit is connected through a capacitor 44 to the grid 24, the grid also being connected through a resistor 46 to a vibrato connection 48. This connection 48, as indicated somewhat schematically, is connected to a vibrato generator 50 through a switch 52.

The inductance 42 is tapped at 21% of the total turns from top to bottom, and this tap is grounded. A tone collector connection 56 is grounded through a resistor 54, conveniently to the aforesaid tap. The junction 30 is also connected through a capacitor 58 to the tone output connection or collector 56. The resistor 54 and capacitor 58 form a differentiating network which causes the output at 56 to have a much higher harmonic complement than the signal at the plate of the oscillator.

The master oscillator 10 operates in a condition approaching class C, and due to the capacitive loading of the plate comprising the capacitor 58 to ground through the resistor 54 and the capacitor 36 to ground through the inductance 42 produces substantially a sawtooth wave form on the plate.

Thus, the output as applied to the collector or output connection 56 through the differentiating network capacitor 58 to resistor 54 is rich in harmonic content, and is well suited for suitable filtering to produce true musical tones.

A negative potential is applied to the second plate 28 through a resistor 60 from a bus 62 to prevent plate 28 from conducting on peaks of A.C. signals that may be coupled to it through capacitor 70 or 74 hereinafter set forth. The second plate 28 is connected through a resistor 64 to an output connection 66 through which plate potential is supplied to plate 28, and which is shunted to ground by a capacitor 68. Capacitor 68 serves in connection with a keying resistor and key switches (not shown) to suppress key clicks and pops. In addition, the plate 28 is coupled through a capacitor 70 to an output connection 72, and is connected through a coupling capacitor 74 to an output bus 76. As will be apparent, oscillation of the master oscillator 10 through the Hartley circuit, including the cathode 22, grid 24 and plate 26 will produce oscillations of the same frequency on the plate 28 whenever a positive voltage is applied at point 66. These oscillations will be of a sawtooth wave form. Furthermore, the output of the plate 28 is adapted to a plurality of separate treatments, as indicated by the connections 66 and 72, and by the output bus 76. The output from the second plate 28, although closely related to the present invention, is not in all respects dependent thereon, and hence forms the subject matter of additional applications.

The first divider oscillator 12 will now be described, and it will be understood that this divider oscillator is illustrative of the remaining divider or slave oscillators. Thus, the oscillator 12 includes a tube 78 the same type as the tube 20, including a cathode 80, a control grid 82, and two plates 84 and 86. Preferably, there are two such tubes contained in a single envelope, and hence the tubes are all conventionally shown with one side of the envelope open. The cathode 80 is grounded, and the plate 84 is connected through a plate load resistor 88 to the B+ bus 34. The second plate 86 is connected to output circuits in the same manner as the second plate of the tube 20, including to an output connection 91, an output connection 92, and the bus 76.

The grid 82 is connected through a capacitor 89 and a resistor 90 to the plate 26 of the tube 20, being driven by the wave form appearing on the plate. The grid also is connected to ground through a capacitor 92 and is also connected to a resistor 94. The resistor 94 is connected to a junction 96, and this junction in turn is shunted to ground by a capacitor 98. The junction is also connected to a resistor 100, and is connected through a resistor 102 to a bias bus or line 103 having potential of −3 volts thereon.

The resistor 100 is connected to a junction 104, and this junction is connected through a wire 106 and resistor 108 to the grid of the oscillator tube in the next divider stage 14. The junction 104 also is connected to a capacitor 110. This capacitor is connected to the plate 84 of the tube 78, and also is connected to a capacitor 112 leading to an output connection 114. The output connection 114 is shunted to ground through a resistor 116.

Before referring to sizes of the components heretofore described, and the theory of operation of the oscillator, it will perhaps be helpful to refer to FIG. 1*a*. Thus, each of the output connections from the divider oscillator including the master oscillator output connection 56, and further including the output connection 114, and other output connections identified with a square (but not including the various outputs from the second plates of the oscillator tubes) are connected to key switches, organ stops, and filters, all indicated quite generally in the box identified by the numeral 118. As will be understood, there is one of the aforesaid output connections for each note in the organ, which for illustrative purposes may be considered to be 60 notes. The key switches, stops and filters are connected to an amplifier 120 of conventional design, and the amplifier is connected to a loud-speaker 122. Conveniently all of the aforegoing parts are mounted in the usual cabinet or console (not shown).

As will be understood, the component values vary in accordance with the particular note to be generated. However, it may be observed that if the capacitor 112 be considered as having a value of C, then the capacitor 98 is approximately $C/2$, and the capacitor 92 $C/3$. These ratios hold true for all of the remaining divider or slave oscillators, and are of considerable importance.

The values of some of the components heretofore given remain constant from one divider string to another. In other words, whether the note C is played in any octave, or whether the note F is played in any octave, the value of the component will be the same. The values of other components vary from one note to another. Furthermore, as will be understood, the values of certain of the components in one slave oscillator vary from those in the succeeding slave oscillators. Thus, for example, the capacitors in the grid circuit of the slave oscillator 12 will vary in value from those of the slave oscillator 14, since the two oscillators operate at different frequencies, at a ratio of 2 to 1. However, by way of illustration there is set forth hereafter a list of representative values for the components heretofore identified. This list should be regarded as illustrative, and not necessarily as conclusive or limiting. Components which are of constant value regardless of the divider string or note being considered are marked with an asterisk.

| | |
|---|---|
| Resistor 32* | 33K. |
| Capacitor 36 | .002μf. |
| Capacitor 40 | .016μf. |
| Inductance 42 | 500mh. |
| Capacitor 44 | .01μf. |
| Resistor 46* | 220K. |
| Resistor 54* | 3.3K. |
| Capacitor 58 | .0018μf. |
| Resistor 60* | 4.7M. |
| Resistor 64* | 1M. |
| Capacitor 68* | .0047μf. |
| Capacitor 70* | .0047μf. |
| Capacitor 74* | .001μf. |
| Resistor 88* | 100K. |
| Capacitor 89 | .000082μf. |
| Resistor 90 | 1M. |
| Capacitor 92 | .00082μf. |
| Resistor 94* | 560K. |
| Capacitor 98 | .0013μf. |
| Resistor 100* | 330K. or 390K. |
| Resistor 102* | 680K. |
| Resistor 108* | 1.5M. |
| Capacitor 110* | .047μf. |
| Capacitor 112 | .0024μf. |
| Resistor 116* | 3.3K. |

Among the values heretofore listed, it will be observed that if capacitor 112 is considered to be equal to C, then capacitor 98 is approximately $C/2$ and the capacitor 92 is approximately $C/3$. The capacitor 98 is of particular importance, and the operation of the oscillator can be changed somewhat by changing the value of this capacitor.

Figures 2, 3, 4, 5, 6:
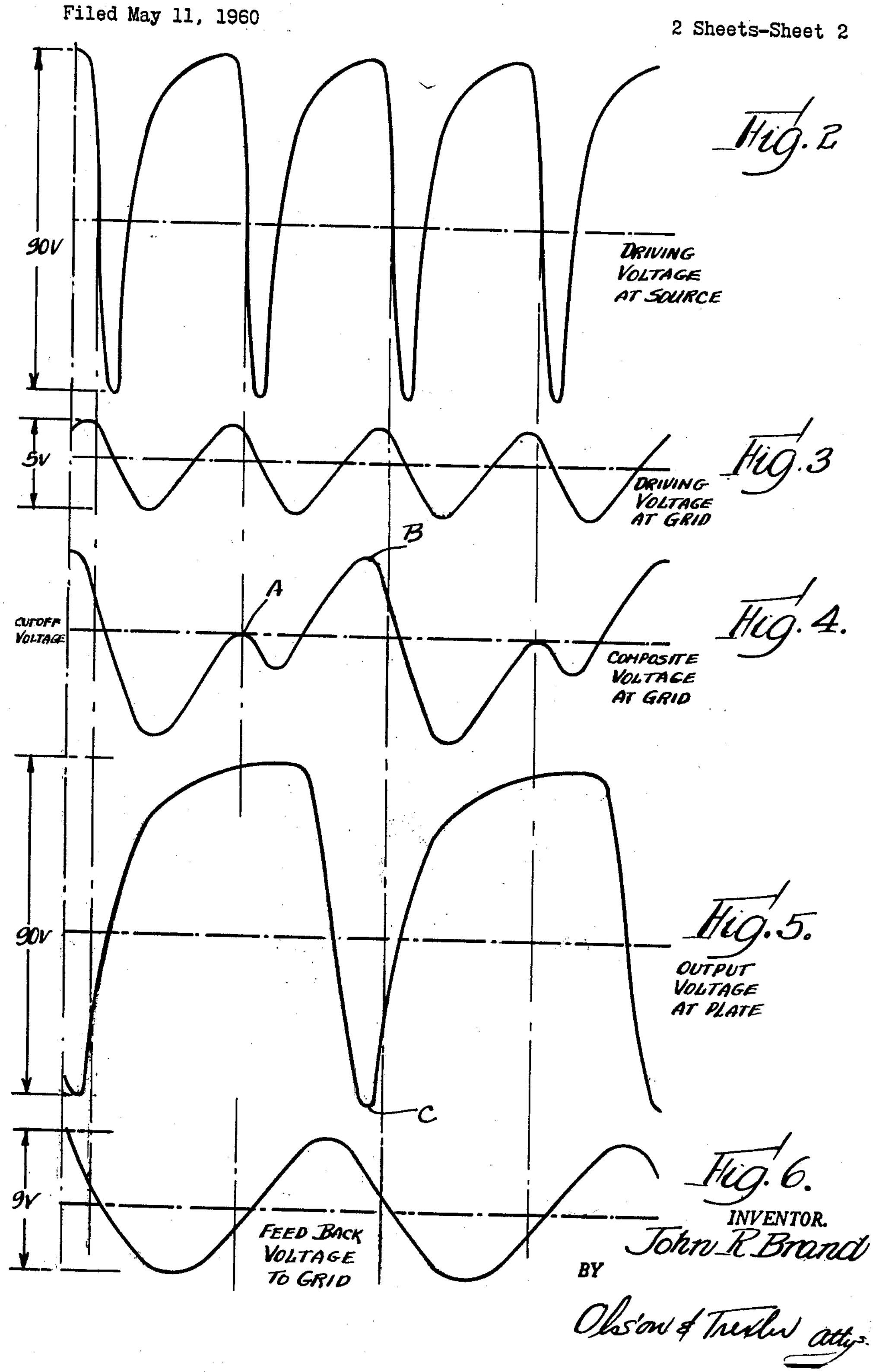
FIG. 3 is a graph of the driving voltage at the grid.
FIG. 4 is a graph of the composite voltage at the grid.
FIG. 5 is a graph of the output voltage at the plate.
FIG. 6 is a graph of the feedback voltage to the grid.

The master oscillator 10, as previously noted, operates in a condition approaching class C, and due to the capacity plate loading produces a generally sawtooth wave form, substantially as shown in FIG. 2. This harmonic-rich wave form is differentiated by capacitor 58 and resistor 54 and is utilized at the output connection 56, and is also fed to the grid 82 of the first divider tube 78 in the first slave or divider oscillator 12. The capacitor 89 is made small so that the driving voltage at the grid of the first divider is approximately the same as for the other dividers, the wave shape of the driving voltage at the grid 82 being as indicated in FIG. 3.

The grid 82 is biased to −3 volts by the bias supply line 104, as heretofore described. In more or less steady state operation, the average bias on the grid is about −4.5 volts. This is almost at cut-off, about −5 volts being necessary for cut-off. Hence, the driving voltage at the grid, see FIG. 3, as integrated from the driving voltage at the source (FIG. 2) is effective on mostly only the positive half-cycles. In effect, this applies a series of positive pulses to the grid of the slave or divider oscillator. This produces a negative pulse on the plate. This negative pulse is fed back to the grid through a type of phase-lag or time-lag network, comprising most particularly the resistors 100, 94 and the capacitors 98, 92. This network not only delays the pulse, but changes its wave form to one having a rather broad negative side, and a narrower peak on the positive side. This wave form, the fed-back voltage to the grid, is shown in FIG. 6. The time or phase-lag is somewhat less than 180° at the output frequency of the divider.

Accordingly, when the second pulse of driving voltage arrives at the grid, the grid is already so far negative, due to the delayed fed-back first pulse, that the peak of the second pulse cannot drive the grid very much above cutoff, if at all. This condition is illustrated in FIG. 4, specifically at point A in FIG. 4. It will be seen that the composite voltage at the grid comes up just about to cutoff for the tube. Hence, no negative pulse is produced at the plate at this time, and the output wave is as shown in FIG. 5. It will be seen that the output wave is exactly the same as that of the driving voltage (FIG. 2), but at one half the frequency (except that the master oscillator wave form varies slightly from all the other output and driving wave forms).

The third pulse of the series that is applied to the grid arrives at a time when the voltage fed back to the grid is in the positive or in-phase direction which causes the amplitude of this third pulse to increase at B in FIG. 4. Hence, another negative pulse in the output is produced as indicated at C in FIG. 5.

Preferably, the divider is designed to have the maximum in-phase feedback at about the upper frequency limit of the divider. When the divider is operating near this point, its dividing action is very similar to that of a conventional phase-shift oscillator. However, as the input frequency to the present divider is lowered from this maximum in-phase feedback point, the amplitude of the voltage fed back to the grid increases and becomes less in-phase with every other positive peak of the driving voltage; the driving voltage developed at the grid also increases because the reactance of capacitor 92 increases as the frequency is lowered. The total effect is that the voltage developed at the grid increases as the frequency is lowered. This allows the negative-going part of the fed-back voltage to hold every other positive-going peak of the driving voltage below cut-off of the tube, even though it is not exactly out of phase with it. In other words, the fed-back voltage can hold every other positive-going driving pulse below cut-off until it becomes more in-phase with the normally "cancelled pulse" than it is with the "pulse" causing the tube to conduct.

Thus, the divider can be considered to operating under two overlapping modes, combining the advantages of both and extending the dividing range beyond the normal capabilities of either. For instance, the circuit can be made to divide over a greater frequency range than 2 to 1.

If the capacitor 98 were relatively large, the divider oscillator would be a phase shift oscillator. Thus, in a sense, the present slave or divider oscillator can be considered to be a phase shift oscillator. However, with the capacitor 98 relatively small, as in the present invention, losses in the circuit prevent oscillation. However, with this small capacitor, the circuit is regenerative, and the stage can be driven with a smaller signal than would otherwise be possible. Along the same lines, if the same signal is used for driving, instead of a smaller signal, then the stage can be synchronized over a wider frequency range, hence leading to greater stability, and allowing a greater degree of vibrato to be applied.

It is important to note that the cathode 80, is directly grounded. This is desirable, since any signal drawn from the plate 86 would change the bias on the oscillating section of the tube if there were any resistance in the cathode circuit.

The output wave of the voltage divider oscillator may be considered to be produced by charging of the capacitor 112 through the resistor 88, with subsequent discharging thereof through the resistor 116. Thus, the capacitor 112 initially charges through the resistor 88. The first positive driving pulse applied to the grid causes the tube to conduct, thereby discharging capacitor 112 through resistor 116. This produces a negative pulse across resistor 116, and from this point the output is taken at 114. As soon as the left-hand section of tubes 78 stops conducting, capacitor 112 rapidly recharges through resistor 88, thus coupling a negative pulse through capacitor 110 and through the time delay circuit of resistor 100 (and also resistor 102), capacitor 98, resistor 94 and capacitor 92 to the grid 82 of tube 78. Coupling of the negative pulse through the capacitor 110, of course, develops both negative and positive characteristics relative to ground. The time delay and wave shaping (or phase-lag and wave shaping) network is normally adjusted so that the negative portion of the fed-back pulse arrives at the grid before the second positive pulse from the master oscillator. However, this fed-back pulse still has sufficient negative potential to cancel the second driving pulse, whereby the tube does not conduct on this positive pulse. Subsequently, as noted heretofore, the positive portion of the fed-back pulse arrives at the grid substantially coincident with the third positive pulse from the master oscillator, whereby to cause the tube 78 again to conduct.

As will be apparent, the signal coupled through capacitor 110 is connected through the wire 106 and resistor 108 to the second divider or slave oscillator 14, etc. The time delay network of the second divider is adjusted to slightly more than twice as long as the time delay network of the first divider so that any small portion of signal that might be fed back from the second divider through the resistor 108 to the first divider does not arrive at a phase relationship and amplitude that would cause a variation in amplitude of every other "pulse" of the first divider. Such variation in amplitude is undesirable, since the ear would detect it as a subharmonic combined with the output frequency of the first divider. The time delay of the subsequent divider or slave oscillators is also slightly more than twice the time delay of each preceding oscillator, to prevent any production of subharmonic notes through feedback.

Considering again the plate circuit, specifically the capacitor 112 and the resistor 88, the charging time constant is equivalent to about four times the divider output frequency. Thus, the plate circuit operates almost entirely as a phase shift network, rather than as a time constant network.

Phase shifting in the slave or divider oscillator comes in primarily in the plate-to-grid network, namely resistor 100 and capacitor 98, and resistor 94 and capacitor 92. Ideally, the phase shift may approach 180°. In practice, with the circuit loaded, and with the tube operating class A, the two-stage circuit has a phase shift of approximately 120° at the design output frequency of the divider. In any event, the phase shift is always substantially greater than 90°. Reference has been made heretofore to the fact that the capacitor 98 has a value about one-half that of the capacitor 112. The circuit will work with the capacitor 98 even smaller, in which case the circuit definitely is not self-oscillatory. The circuit may oscillate by itself with the capacitor of the size described as preferred, but it does not necessarily do so. The divider oscillator can also be made to work if the capacitor 98 is very large, say on the order of ten times as large, compared to the capacitor 112. The total phase-shift around the feedback loop increases enough to cause the frequency of oscillation tendency to be at a much lower frequency. However, at this frequency losses in the circuit are such as to prevent oscillation. Stated another way, as the relative size of the capacitor 98 increases, the circuit becomes regenerative, then becomes self-oscillatory, and finally returns to being regenerative.

The position of the grid return resistor 102 is not particular critical, and need not be in the exact position illustrated. Similarly, the coupling (or D.C. blocking) capacitor 110 may be varied somewhat in position without adversely affecting operation of the divider oscillator. In fact, under certain conditions, the D.C. blocking capacitor 110 can even be eliminated.

The examples of the invention as herein shown and described are to be understood as being illustrative in nature. Various changes in structure will no doubt occur to those skilled in the art, and will be understood as forming a part of this invention insofar as they fall within the spirit and scope of the appended claims.

The invention is claimed as follows:

1. In an electronic musical instrument having an amplifier, electroacoustic transducing means connected to said amplifier for converting amplified electronic oscillations into sound, a plurality of interconnected key switches, stops and filters, and a plurality of stable master oscillators; a plurality of phase-lag electronic divider oscillators, said divider oscillators being connected in divider chains to said master oscillators and to one another, each of said divider oscillators being respectively connected to a preceding oscillator in one of said chains and driven thereby and to one of said key switches, each of said oscillators being constructed and arranged to produce electronic oscillations of a predetermined frequency one-half the frequency of the preceding oscillator, each of said divider oscillators comprising an electronic valve having anode, cathode and control elements, means applying a D.C. potential across said anode and cathode elements, said cathode element being grounded, a resistance-capacitance phase-shift feedback network between said anode element and said control element, said phase-shift feedback network consisting of two resistors in series with one another from said anode element to said control element and a pair of capacitors shunting said resistors to ground, one resistor being connected to ground from between said resistors and the other being connected to ground from said control element, a capacitor connected from said anode element to the resistor remote to said control element, and a common fixed D.C. bias means connected between ground and all of said divider oscillators, said bias means being connected between the two series resistors of each feedback network.

2. The combination set forth in claim 1 and further including an output capacitor connected to each anode element, an output resistor connected from each output capacitor to ground, and means providing a signal output connection to a respective key switch at the junction between said output capacitor and said output resistor.

References Cited by the Examiner

UNITED STATES PATENTS

| | | | |
|---|---|---|---|
| 2,342,286 | 2/44 | Kock | 84—1.19 |
| 2,665,379 | 1/54 | Hadden | 331—51 |
| 2,777,952 | 1/57 | Spencer | 331—137 |
| 2,906,960 | 1/59 | Bode | 331—59 |

OTHER REFERENCES

Chance et al.: Waveforms (text), 1st Ed., 1949, McGraw-Hill, pages 110 to 112 relied on.

ARTHUR GAUSS, *Primary Examiner.*

CARL W. ROBINSON, *Examiner.*